United States Patent [19]

Tsuchiya et al.

[11] Patent Number: 4,460,724

[45] Date of Patent: Jul. 17, 1984

[54] HOT MELT COMPOSITION CONTAINING A HYDROGENATED RESIN COPOLYMER

[75] Inventors: Shozo Tsuchiya, Tokyo; Akio Ohshima; Hideo Hayashi, both of Yokohama, all of Japan

[73] Assignee: Nippon Oil Co., Ltd., Tokyo, Japan

[21] Appl. No.: 408,387

[22] Filed: Aug. 13, 1982

[30] Foreign Application Priority Data

Aug. 21, 1981 [JP] Japan ................. 56-130125

[51] Int. Cl.$^3$ .................. C08L 23/08; C08L 9/00; C08L 45/00
[52] U.S. Cl. ........................... 524/77; 524/487; 524/488; 524/522; 524/523; 524/518; 524/525; 525/171; 525/211; 525/216; 525/222
[58] Field of Search .............. 525/211, 216, 222, 171; 524/77, 487, 488

[56] References Cited

U.S. PATENT DOCUMENTS

| | | | |
|---|---|---|---|
| 3,911,185 | 10/1975 | Wright | 525/211 |
| 3,927,144 | 12/1975 | Hayashi et al. | 525/211 |
| 4,012,547 | 3/1977 | Smedberg | 428/97 |
| 4,022,850 | 5/1977 | Booth et al. | 525/211 |
| 4,048,124 | 9/1977 | Ishikawa et al. | 525/211 |
| 4,157,363 | 6/1979 | Hepworth | 525/211 |
| 4,360,622 | 11/1982 | Tsuchiya et al. | 524/275 |
| 4,413,067 | 11/1983 | Tsuchiya et al. | 523/172 |
| 4,419,497 | 12/1983 | Tsuchiya et al. | 525/338 |

*Primary Examiner*—Carman J. Seccuro
*Attorney, Agent, or Firm*—Jordan & Hamburg

[57] ABSTRACT

A hot melt composition is provided which comprises (1) a hydrogenated resin (II) having a softening point ranging from 50° C. to 140° C., said hydrogenated resin (II) being prepared by hydrogenating a copolymer resin (I) obtained by copolymerizing 20 to 60 wt % of a component (A) selected from the group consisting of five-member cyclic compounds each having a conjugated double bond and represented by the general formula (A) given below and Diels-Alder addition products thereof (A):

GENERAL FORMULA (A):

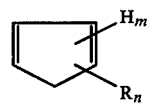

wherein H is hydrogen; R is an alkyl group having from 1 to 3 carbon atoms; m and n are zero or integers of not less than 1 and are in the relation of m+n=6;

with 25 to 70 wt % of a codimer (component B) of said five-member cyclic compound and an aliphatic conjugated diolefin having 4 to 5 carbon atoms and 2.5 to 40 wt % of at least one unsaturated monomer (component C) selected from the group consisting of polar vinyl compounds; and (2) one or more compound selected from the group consisting of ethylenic copolymers, polyester resins and waxes.

10 Claims, No Drawings

HOT MELT COMPOSITION CONTAINING A HYDROGENATED RESIN COPOLYMER

BACKGROUND OF THE INVENTION

1. Field of the Invention

The present invention relates to a novel hot melt composition excellent in adhesive property. More particularly, it relates to a hot melt composition which is solid at ambient temperature and may be melted by heating to be applied on various materials and then solidified again by cooling to adhere onto the materials for serving as an adhesive or coating composition.

2. Prior Art

The commonly used matrix polymers for the hot melt compositions are polyethylene base copolymers such as ethylene-vinyl acetate copolymers and ethylene-acrylate copolymers and thermoplastic polymers such as polyethylene, polyamides, polyurethanes and polyesters, to which a variety of waxes are blended as a viscosity adjusting agent and a tackifying resin.

Natural resins, such as rosin and rosin esters, have been widely used as the prior art tackyfying resins. Among them, rosin esters are recommended because of their excellent tackifying properties. However, such natural resins are unstable in cost and supply. For this reason there is an increasing tendency of using petroleum resins in place of the rosin esters in recent years.

However, petroleum resins have various disadvantages, particularly they are poor in tackifying and heat resistant properties. Although many proposals have been made to eliminate the aforementioned disadvantages, a petroleum resin having satisfactory properties has not yet been produced. It has been tried to hydrogenate petroleum resins for improving hues and heat resistant properties thereof. For example, those obtained by completely hydrogenating aromatic petroleum resins or cyclopentadiene base resins have been widely used. However, the tackifying properties, e.g. peeling strength, of such resins are extremely poor.

It has also been proposed to use a hydrogenation product of a copolymer of a cyclopentadiene base monomer and an ethylenic unsaturated ester (see Unexamined Japanese Patent Publication No. 70450/'75). However, it is difficult to control the softening point and molecular weight distribution of the resultant resin with a further disadvantage that the adhesive property of the resultant resin is unsatisfactory. This prior-made proposal cannot practically operated in an industrial scale, since the resultant resin contains insoluble low molecular weight products when the softening point and the molecular weight distribution are controlled within the proper ranges.

Japanese Patent Publication No. 46426/'80 and Unexamined Japanese Patent Publication No. 54342/'80 disclose the use of a resin prepared from a cyclopentadiene base monomer and a polar vinylidene compound. However, the hot melt compositions proposed by these prior publications are prepared directly from the resultant resins without hydrogenation. The thus prepared hot melt composition are extremely poor in heat resistant property. In addition, in preparation of the hot melt compositions, the resins emit intensive odor and are colored appreciably. Furthermore, the viscosity of the molten resins is unstably changed with the formation of gels. Having the aforementioned disadvantageous properties, the resins proposed by the prior publications are not satisfactory for use in hot melt adhesive compositions.

After eager pursuits for overcoming the aforementioned disadvantages of the prior art technology, we have developed a process for the preparation of a resin superior in tackifying property. We have also found that a hot melt composition having excellent adhesive property can be obtained by mixing an appropriate amount of the resin with other components.

OBJECTS AND SUMMARY OF THE INVENTION

An object of this invention is to provide a novel hot melt composition which is remarkably improved in adhesive property.

Another object of this invention is to provide a novel hot melt composition which is particularly excellent in peeling strength.

A further object of this invention is to provide a novel hot melt composition improved in transparency and hue.

A still further object of this invention is to provide a novel hot melt composition which is improved in miscibility.

Yet a further object of this invention is to provide a novel hot melt composition which can adhere onto a film made of plastics, such as polyesters, intimately with strong adhesive power.

These and other objects of the invention will become apparent from the following description.

The hot melt composition provided according to this invention comprises:

(1) a hydrogenated resin (II) having a softening point ranging from 50° C. to 140° C., said hydrogenated resin (II) being prepared by hydrogenating a copolymer resin (I) obtained by copolymerising 20 to 60 wt% of a component (A) selected from the group consisting of five-member cyclic compounds each having a conjugated double bond and represented by the general formula (A) given below and Diels-Alder addition products thereof (A):

GENERAL FORMULA (A)

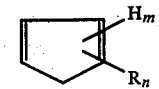

wherein H is hydrogen; R is an alkyl group having from 1 to 3 carbon atoms; m and n are zero or integers of not less than 1 and are in the relation of $m+n=6$;
with 25 to 70 wt% of a codimer (component B) of said five-member cyclic compound and aliphatic conjugated diolefin having 4 to 5 carbon atoms and 2.5 to 40 wt% of at least one unsaturated monomer (component C) selected from the group consisting of polar vinyl compounds; and (2) one or more compound selected from the group consisting of ethylenic copolymers, polyesters and waxes.

DESCRIPTION OF THE INVENTION

The hot melt composition according to this invention will now be described more specifically.

The hydrogenated resin (II) used in this invention is prepared by hydrogenating a copolymer resin (I) obtained by the copolymerization of the components (A), (B) and (C). The hydrogenated resin (II) has a softening point ranging from 50° C. to 140° C.

The component (A) includes five-member cyclic compounds each having a conjugated double bond and represented by the following general formula (A) of:

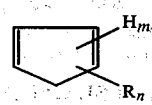

wherein H is hydrogen; R is an alkyl group having 1 to 3 carbon atoms; m and n are zero or integers of not less than 1 and are in the relation of m+n=6; and/or Diels-Alder addition products thereof.

More specifically, those which may be used preferably on an industrial scale include five-member cyclic compounds such as cyclopentadiene and methycyclopentadiene, Diels-Alder addition products thereof such as dicyclopentadiene, cyclopentadiene-methylcyclopentadiene codimer and tricyclopentadiene, and mixtures thereof, particularly preferred being cyclopentadiene, dicyclopentadidne and a mixture thereof.

The component (A) may contain unsaturated compounds, particularly unsaturated aromatic compounds, of a petroleum fraction in an amount of less than the equivalent amount, for example 30% or lower of the five-member cyclic compounds and/or the Diels-Alder addition products thereof. For example, styrene, α-methylstyrene, vinyl toluene, indene, methylindene and a mixture thereof may be mixed to the component (A). From the industrial standpoint of view, it is preferred that the so-called C9-fraction obtained as a by-product in the cracking of naphtha be mixed to the component (A).

The component (B) used in this invention is a codimer of the aforementioned five-member cyclic compound and an aliphatic conjugaged diolefin having 4 to 5 carbon atoms. More specifically, preferable examples are one or more of tetrahydroindene, vinylnorbornene and alkyl substituents of tetrahydroindene and vinylnorbornene which are codimers of cyclopentadiene and 1,3-butadiene having 4 carbon atoms. Further examples are one or more of codimers of cyclopentadiene and a conjugated diolefin having 5 carbon atoms including isoprene and 1,3-pentadiene. More specifically, one or a mixture of two or more of methyltetrahydroindene, isopropenylnorbornene, 2,2-methylvinylnorbornene, 3-methyl-2-vinylnorbornene and 2-propenylnorbornene may be used as the component (B).

A small amount of any of the dimers of 1,3-butadiene, isoprene and 1,3-pentadiene may be contained in the component (B). Such dimers are produced at the step of preparing the component (B), the codimers of a five-member cyclic compound and an aliphatic conjugated diolefin having 4 to 5 carbon atoms.

The component (C), namely the at least one unsaturated monomer selected from the group consisting of polar vinyl compounds, preferably having 3 to 20 carbon atoms, more preferably 3 to 10 carbon atoms, include unsaturated carboxylic acids, such as acrylic acid and methacrylic acid; esters of unsaturated carboxylic acids, such as methyl esters, ethyl esters, butyl esters, β-hydroxyethyl esters of acrylic acid and methacrylic acid; unsaturated dicarboxylic acids, such as maleic acid and itaconic acid, anhydrides and diesters of the aforementioned unsaturated dicarboxylic acids; unsaturated alcohols such as allyl alcohol; lower carboxylic acid esters of unsaturated alcohols, such as vinyl acetate, vinyl propionate, allyl acetate and allyl propyonate; unsaturated aldehydes, such as acrolein and methacrolein; unsaturated nitriles, such as acrylonitrile and methacrylonitrile; and unsaturated ethers such as unsaturated allyl glycidyl ether. Methyl methacrylate, methyl acrylate and vinyl acetate are particularly preferred in the industrial scale production.

In the present invention, the mixing ratios of respective components (A), (B) and (C) subjected to copolymerization must be within the range defined in the claims. More specifically, the mixing ratio of component (A) in the mixture must be in the range of 20 to 60 wt%, preferably 25 to 50 wt%, the mixing ratio of component (B) must be in the range of 25 to 70 wt%, preferably 30 to 60 wt%, and the mixing ratio of component (C) must be in the range of 2.5 to 40 wt%, preferably 5 to 30 wt%.

If the amount of component (B) exceeds the defined range, the softening point of the resultant copolymer resin (I) becomes too low and the yield of the resultant copolymer (I) is disadvantageously decreased. On the contrary, if the amount of component (B) is less than the defined range, the properties of the resultant copolymer (I) are not distinguishable from those of a copolymer prepared from a mixture of the component (A) and component (C), leading to broadening of molecular weight distribution due to difficulty in controlling the softening point and the molecular weight distribution of the copolymer resin (I). If such a copolymer resin (I) having a wide molecular weight distribution is hydrogenated to obtain a hydrogenated resin (II) to be used as a material for a hot melt adhesive composition, the resultant hot melt adhesive composition is unsatisfactory in adhesive property and thermal stability.

If the amount of component (C) exceeds the defined range, the softening point of the resultant copolymer resin (I) becomes too low with a bad hue and the yield of the copolymer resin (I) is decreased. On the contrary, if the amount of component (C) is less than the defined range, the properties of the resultant copolymer resin (I) are not distinguishable from those of a copolymer prepared from the component (A) and component (B). If such a copolymer resin (I) having unsatisfactory properties is hydrogenated to obtain a hydrogenated resin (II) to be used as a material for a hot melt adhesive composition, the resultant hot melt composition is unsatisfactory in adhesive property. A hot melt composition having sufficiently high adhesive power can be obtained only when the mixing ratios of respective components (A), (B) and (C) are within the rnages as defined in the claims.

The copolymer resin (I) may be obtained by copolymerizing a mixture of components (A), (B) and (C) mixed in the ratios as aforementioned in the absence of a catalyst. A copolymer resin may be prepared by copolymerizing a mixture of the components (A), (B) and (C) at 200° C. to 300° C. for 30 minutes to 15 hours, preferably 1 to 7 hours.

It is not essential to use a solvent in the copolymerization step. However, it is desirous that the copolymerization be effected in the presence of a solvent to facilitate easy control of the copolymerization reaction. A variety of inert hydrocarbon solvents may be used for this purpose, and preferable solvents include pentane, hexane, heptane, benzene, toluene, xylene and cyclohexane.

According to this invention, the copolymer resin (I) prepared under the condition as aforementioned is hydrogenated. Hydrogenation of the copolymer resin (I) may be effected according to the known technique used for hydrogenating general petroleum resins or cyclopentadiene base resins. In detail, the hydrogenated resin of the present invention may be obtained from the aforementioned copolymer resin (I) either by directly hydrogenating the melted copolymer resin (I) or by initially dissolving the copolymer resin (I) in a hydrocarbon solvent such as hexane, heptane, octane, cyclohexane, methylcyclohexane, decalin, benzene, toluene or xylene, and then hydrogenating by the use of a catalyst including one or more of active metals selected from the group consisting of the Group VIII metals such as nickel, palladium, ruthenium, rhodium, cobalt and platinum series metals, the Group VI metals such as tungsten, chromium and molybdenum, the Group VII metals such as rhenium and manganese, and copper, the catalyst metal or metals being used directly without being carried or alternatively carried by a solid carrier such as alumina, silica-alumina or diatomaceous earth, and the hydrogenation being effected at a temperature of from 0° C. to 350° C., preferably 150° C. to 280° C., under a hydrogen pressure of from the atmospheric pressure to 200 kg/cm$^2$.G.

It is essential that the hydrogenated resin (II) prepared by the process described above has a softening point of from 50° C. to 140° C., preferably 80° C. to 110° C. If the softening point is lower than the aforementioned range, the coagulative force of the hot melt composition is disadvantageously lowered, resulting in unsatisfactory adhesive property. If the softening point is higher than the aforementioned range, the tackifying effect of the resin (II) is lowered, leading to reduction in adhesive power of the hot melt composition.

In the present invention, one or more compounds selected from the group consisting of ethylenic copolymers, polyester resins and waxes are blended with the hydrogenated resin (II). The ethylenic copolymers include copolymers of ethylene with polar vinyl compounds, the representative examples being copolymers of ethylene with vinyl acetate, an acrylic ester or a methacrylic ester. The ethylenic copolymers generally used in this invention may contain 5 to 25 mol% of polar vinyl compounds.

The polyester resins used in this invention include polyester products prepared from dicarboxylic or polycarboxylic acids having 4 to 20 carbon atoms and dihydric or polyhydric alcohols having 2 to 20 carbon atoms, the polyester products generally having the average molecular weights ranging within 500 to 50,000, preferably within 800 to 25,000. Preferred polyester resins are those prepared by using a phthalic acid, such as terephthalic acid or isophthalic acid, as the main constituent of the dicarboxylic acids in combination with a glycol having 2 to 10 carbon atoms, such as ethylene glycol and propylene glycol or esters thereof.

Petroleum origin waxes, such as paraffin wax and microcrystalline wax, natural waxes derived from animals and vegitables, and synthetic waxes, such as polyethylene wax and polypropylene wax, may be used depending on the applied uses.

The hot melt composition according to this invention is prepared by mixing the aforementioned hydrogenated resin (II) acting as a tackifying resin component, with one or a mixture of ethylenic copolymers and/or polyester resins and/or waxes. The mixing ratio of the hydrogenated resin (II) to the ethylenic copolymer and/or polyester resin and/or wax may be selected in a wide range. 4 to 300 parts, by weight, of the hydrogenated resin (II) may be mixed with 100 parts, by weight, of ethyleneic copolymer and/or a polyester resin and/or wax. In hot melt compositions for general uses, 100 parts, by weight, of an ethylenic copolymer and/or a polyester resin may be mixed with 20 to 300 parts, by weight, of the hydrogenated resin (II) and 10 to 400 parts, by weight, of a wax. If necessary, other tackifying resins such as rosin and derivatives thereof or terpene resins may be used together, and 0 to 5 wt% of a filler such as calcium carbonate, titanium oxide, talc or clay, 0 to 5 wt% of an antioxidant, 0 to 20 wt% of a plasticizer and 0 to 10 wt% a pigment may be added. When said hot melt composition is used for an adhesive for packing materials such as paper, plastics film or aluminium film, a composition containing a relatively small amount of ethylenic copolymer is selected. On the other hand, it is desirous to prepare a composition which contains a large amount of ethylenic copolymer or to prepare a composition mainly composed of the ethylenic copolymer and said hydrogenated resin (II), when the hot melt composition is used for woodworking and bookmaking purposes where a relatively powerful adhesive force is required.

EXAMPLE OF THE INVENTION

The examples and synthesis examples of the present invention will be given hereinbelow with the aim to clarifying the features of the invention more specifically. However, the present invention should not be limited only to the illustrated examples, but includes other variations and modifications embraced within the spirit and scope thereof as defined in the appended claims. In the following examples, "parts" stand for parts by weight, and the softening point, the hue and the bromine value have been determined in accordance with the following methods:

Softening Point: JIS K2531-60 (Ring and Ball Test Method)
Hue: ASTM D-1544-58T (Gardner Color)
Bromine Value: JIS K-2543-65

Synthesis Examples 1 to 11 (Preparation of Resin Used in Examples)

Each of the monomer mixtures as set forth in Table 1 was charged into a 2 liter volume autoclave and polymerized under the conditions respectively set forth in Table 1 in the nitrogen atmosphere. After removing the unreacted materials and oligomers by distillation, eleven varieties of the copolymer resin (I) denoted by I-1, I-2, I-3, I-4, I-5, I-6, I-7, I-8, I-9, I-10 and I-11 were obtained.

Comparative Synthesis Example 1

30.0 wt% of dicyclopentadiene and 70.0 wt% of xylene were charged in a 2 liter volume autoclave, and reacted at 260° C. for 1.5 hours in the nitrogen atmosphere to obtain a polymer solution. By removing the unreacted materials, oligomers and xylene from the polymer solution by distillation, a resin I-a was obtained. The properties of the resin I-a are shown in Table 1.

Comparative Synthesis Example 2

35.0 wt% of dicyclopentadiene and 65.0 wt% of tetrahydroindene were charged into a 2 liter volume autoclave, and reacted at 265° C. for 5 hours in the nitrogen atmosphere. By removing the unreacted materials and oligomers from the resultant polymer solution by distillation, a resin I-b was obtained. The properties of the resin I-b are shown in Table 1.

Comparative Synthesis Example 3

67.0 wt% of dicyclopentadiene, 13.0 wt% of methylmethacrylate and 20.0 wt% of xylene were charged into a 2 liter volume autoclave, and reacted at 260° C. for 4 hours in the nitrogen atmosphere. By removing the unreacted materials, oligomers and xylene from the polymer solution by distillation, a resin I-c was obtained.

Comparative Synthesis Example 4

The operation conducted in Comparative Synthesis Example 3 was repeated except in that the reaction time was changed to 1 hour to control the softening point and the molecular weight distribution of the resultant polymer. However, the resultant resin was not uniform and contained insoluble masses.

TABLE 1

| | | | Synthesis Example | | | | | | | |
|---|---|---|---|---|---|---|---|---|---|---|
| | | | 1 | 2 | 3 | 4 | 5 | 6 | 7 | 8 |
| | Copolymer Resin | | I-1 | I-2 | I-3 | I-4 | I-5 | I-6 | I-7 | I-8 |
| Composition of Starting Materials | Component (A) | Dicyclopentadiene (wt %) | 30.0 | 34.0 | 38.0 | 42.0 | 30.0 | 36.0 | 38.0 | 33.0 |
| | Component (B) | CPD-Butadiene Codimer (wt %) | 65.0 | 56.0 | 42.0 | 28.0 | 60.0 | 54.0 | 42.0 | 62.0 |
| | | CPD-Isoprene Codimer (wt %) | 0 | 0 | 0 | 0 | 0 | 0 | 0 | 0 |
| | Component (C) | Polar Monomer* (wt %) | MMA 5.0 | MMA 10.0 | MMA 20.0 | MMA 30.0 | VAC 10.0 | MA 10.0 | MA 20.0 | HEA 5.0 |
| | Solvent | Xylene (wt %) | 0 | 0 | 0 | 0 | 0 | 0 | 0 | 0 |
| Condition for polymerization | | Temperature (°C.) | 265 | 265 | 280 | 280 | 280 | 280 | 280 | 280 |
| | | Time (hr.) | 5 | 5 | 3 | 3 | 5 | 4 | 5 | 3 |
| Properties of Copolymer Resin (I) | | Yield of Resin (%) | 56.3 | 67.8 | 75.6 | 82.5 | 57.6 | 74.2 | 82.0 | 63.8 |
| | | Softening Point (°C.) | 93.0 | 87.5 | 101.0 | 99.5 | 88.0 | 93.5 | 92.0 | 89.0 |
| | | Bromine Value | 112 | 106 | 94 | 81 | 104 | 106 | 88 | 108 |
| | | Hue in Molten State (Gardner) | 7− | 7 | 12− | 12− | 8+ | 8− | 9− | 8 |

| | | | Synthesis Example | | | Comparative Synthesis Example | | |
|---|---|---|---|---|---|---|---|---|
| | | | 9 | 10 | 11 | 1 | 2 | 3 |
| | Copolymer Resin | | I-9 | I-10 | I-11 | I-a | I-b | I-c |
| Composition of Starting Materials | Component (A) | Dicyclopentadiene (wt %) | 34.0 | 30.0 | 36.0 | 30.0 | 35.0 | 67.0 |
| | Component (B) | CPD-Butadiene Codimer (wt %) | 56.0 | 0 | 0 | 0 | 65.0 | 0 |
| | | CPD-Isoprene Codimer (wt %) | 0 | 65.0 | 49.0 | 0 | 0 | 0 |
| | Component (C) | Polar Monomer* (wt %) | AL 10.0 | MMA 5.0 | MMA 15.0 | 0 | 0 | MMA 13.0 |
| | Solvent | Xylene (wt %) | 0 | 0 | 0 | 70.0 | 0 | 20.0 |
| Condition for polymerization | | Temperature (°C.) | 280 | 265 | 280 | 260 | 265 | 265 |
| | | Time (hr.) | 5 | 5 | 2.5 | 1.5 | 5 | 4 |
| Properties of Copolymer Resin (I) | | Yield of Resin (%) | 53.8 | 53.1 | 69.0 | 51.0 | 54.2 | 75.0 |
| | | Softening Point (°C.) | 93.5 | 101.0 | 94.5 | 95.0 | 106.0 | 151.0 |
| | | Bromine Value | 108 | 118 | 100 | 120 | 112 | 110 |
| | | Hue in Molten State (Gardner) | 9 | 8 | 11 | 8 get cloudy | 7+ | 8 |

*Note:
MMA = Methyl Methacrylate,
MA = Methyl Acrylate,
AL = Allyl Alcohol
VAC = Vinyl Acetate
HEA = β-Hydroxyl Methacrylate

Preparation of Hydrogenated Resins (II)

The resins I-1 to I-11 and I-a, I-b and I-c prepared by Synthesis Examples 1 to 11 and Comparative Synthesis Examples 1 to 3 were hydrogenated following to the procedures described below and under the conditions set forth in Table 2. 100 g for each of the resins I-1 to I-11, I-a, I-b and I-c was mixed with 100 g of a solvent, NISSEKI No. 0 Solvent L produced by Nippon Oil Company Limited, and 5 g of a catalyst (a sulfur-resistant stabilized nickel catalyst, N-113 produced by NIKKI Kagaku K.K.) in a 500 ml autoclave provided with a stirrer. After the completion of hydrogenation, the reaction product was cooled and then discharged from the autoclave. After removing the catalyst by filtration, the solvent was distilled off to obtain hydrogenated resins (II). In preparation of the comparative hydrogenated resin II-a, the filtration was difficult.

TABLE 2

| Hydrogenated Resin | | Hydrogenated Resin of the Invention | | | | | | | | | | | Hydrogenated Resin for Comparative Example | | |
|---|---|---|---|---|---|---|---|---|---|---|---|---|---|---|---|
| | | II-1 | II-2 | II-3 | II-4 | II-5 | II-6 | II-7 | II-8 | II-9 | II-10 | II-11 | II-a | II-b | II-c |
| Copolymer Resin (I) Subjected to Hydrogenation | | I-1 | I-2 | I-3 | I-4 | I-5 | I-6 | I-7 | I-8 | I-9 | I-10 | I-11 | I-a | I-b | I-c |
| Condition for Hydrogenation | Temperature (°C.) | 270 | 230 | 280 | 280 | 210 | 250 | 250 | 210 | 200 | 230 | 260 | 250 | 250 | 250 |
| | Time (hr.) | 3 | 3 | 3 | 5 | 3 | 3 | 3 | 3 | 3 | 3 | 3 | 3 | 3 | 3 |
| | Pressure (kg/cm$^2$ · G) | 80 | 80 | 80 | 120 | 80 | 80 | 80 | 100 | 100 | 80 | 80 | 60 | 60 | 80 |
| Properties of Hydrogenated Resin (II) | Softening Point (°C.) | 96.0 | 94.0 | 103.0 | 99.0 | 91.0 | 95.0 | 95.0 | 90.0 | 93.5 | 105.0 | 99.5 | 99.0 | 108.0 | 153.0 |
| | Bromine Value | 6 | 10 | 13 | 16 | 11 | 10 | 13 | 13 | 11 | 12 | 13 | 6 | 7 | 12 |
| | Hue in Molten State (Gardner) | 1⁻ | 1⁻ | 3 | 3 | 1⁻ | 1⁻ | 2⁻ | 3 | 3 | 1⁻ | 2⁻ | 1⁻ | 1⁻ | 2 |

Examples 1 to 11 and Comparative Examples 1 to 3

(Preparation of Hot Melt Adhesives and Properties Thereof)

40 parts of each of the hydrogenated resins (Resins II-1 to II-11 and II-a, II-b and II-c) obtained by the preceding Synthesis Examples and Comparative Synthesis Examples, 40 parts of an ethyelene-vinyl acetate copolymer "EVAFLEX 220" produced by Mitsui Polychemical Co., Ltd. and 20 parts of 145° F. paraffin wax were melted and uniformly mixed together to prepare a hot melt composition. The adhesive strength of each of the thus prepared compositions was tested by measuring the peeling strength. The peeling test was conducted in accordance with the following procedures. 5 g of each of the resultant compositions was molded in an aluminium foil of 150×200 mm in dimensions and 0.2 mm in thickness at 180°. C. for 3 minutes under a pressure of 150 kg/cm$^2$.G to form a test specimen of 0.2 mm in thickness and 25 mm in width, which was subjected to peeling test conducted generally in accordance with the ASTM D1876-61T Method to determine the Al/Al peeling strength. Similarly, the Polyester/Polyester peeling strength was determined. The cloud point of each of the hot melt compositions was determined. 10 g of each of the hot melt compositions was put into a test tube, melted and mixed and then allowed to stand for cooling to find out the temperature at which a portion of the composition became cloudy, said temperature being determined as the cloud point. Also, the hue of each hot melt composition was determined. The results of the tests are shown in Table 3.

TABLE 3

| | Example | | | | | | | | | | | Comparative Example | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| Used Hydrogenated Resin | II-1 | II-2 | II-3 | II-4 | II-5 | II-6 | II-7 | II-8 | II-9 | II-10 | II-11 | II-a | II-b | II-c |
| Al/Al Peeling Strength (g/25 mm) | 2000 | 2200 | 2450 | 2800 | 2000 | 2050 | 2400 | 2150 | 2150 | 1700 | 2200 | 1000 | 1400 | 700 |
| Polyester/Polyester Peeling Strength (g/25 mm) | 1250 | 1750 | 2100 | 2500 | 1400 | 1700 | 2050 | 1350 | 1200 | 1450 | 1850 | 100 | 150 | 100 |
| Cloud Point (°C.) | 67 | 66 | 65 | 65 | 67 | 67 | 65 | 68 | 68 | 67 | 68 | 72 | 69 | 85 |
| Hue in Molten State | White | White | Light Yellow | Light Yellow | White | White | Light Yellow | Light Yellow | Light Yellow | White | Light Yellow | White | White | Brown |

As will be apparent from Table 3, the hot melt compositions according to this invention, namely examples 1 to 11, have satisfactory peeling strengths. In contrast thereto, Comparative Example 1 wherein a hydrogenated resin obtained from a homo-polymer of dicyclopentadiene is used, does not exhibit sufficiently high adhesive property. Similarly, sufficiently high adhesive property is not obtained by the use of a hot melt composition in which a hydrogenated resin obtained by the hydrogenation of a resin excluding the component (C) is used, as shown by Comparative Example 2. The hot melt composition of Comparative Example 3 was prepared by using a hydrogenated resin obtained from a resin excluding the component (B). As shown in the Table, the composition of Comparative Example 3 was colored at the step of blending the composition to form the hot melt composition, because the hydrogenated resin used threin is poor in thermal stability. Moreover, a hot melt composition having good adhesive property could not be prepared by the use of the hydrogenated resin used in Comparative Example 3, because the melting point of the resin could not be easily controlled.

As has been described in Comparative Synthesis Example 4, a uniform resin could not be obtained when the reaction mixture used in Comparative Synthesis Example 3 was polymerized within a shortened reaction time with the intention to control the softening point of the resultant resin. This result clearly reveals that the component (B) is an essential element in the hydrogenated resin (II) of the hot melt composition according to this invention.

Further, the cloud point of each hot melt composition according to this invention was lower than that of each of the Comparative Examples. This shows that the hydrogenated resin (II), ethylene-vinyl acetate copolymer and paraffin wax are miscible in the hot melt composition of the present invention.

While the present invention has been described with reference to the specific examples, it would be understood that the invention is not restricted to such examples, but any change and modification may be made within the spirit and scope of the present invention as recied in the appended claims.

What is claimed is:

1. A hot melt composition comprising: (1) a hydrogenated resin (II) having a softening point ranging from 50° C. to 140° C., said hydrogenated resin (II) being prepared by hydrogenating a copolymer resin (I) obtained by copolymerizing 20 to 60 wt% of a component (A) selected from the group consisting of five-member cyclic compounds each having a conjugated double bond and represented by the general formula (A) given below and Diels-Alder addition products thereof (A):

GENERAL FORMULA (A):

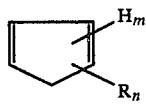

wherein H is hydrogen; R is an alkyl group having from 1 to 3 carbon atoms; m and n are zero or integers of not less than 1 and are in the relation of $m+n=6$; with 25 to 70 wt% of a codimer (component B) of said five-member cyclic compound and an aliphatic conjugated diolefin having 4 to 5 carbon atoms and 2.5 to 40 wt% of at least one unsaturated monomer (component C) selected from the group consisting of polar vinyl compounds; and (2) one or more compound selected from the group consisting of copolymers of ethylene with polar vinyl compounds, polyester resins and waxes.

2. A hot melt composition according to claim 1, wherein said five-member cyclic compounds include cyclopentadiene, methylcyclopentadidene and mixtures thereof.

3. A hot melt composition according to claim 1, wherein said Diels-Alder addition products of said five-member cyclic compounds include dicyclopentadiene, cyclopentadiene-methylcyclopentadiene co-dimer, tricyclopentadiene and mixtures thereof.

4. A hot melt composition according to claim 1, wherein said codimer (component B) is selected from the group consisting of tetrahydroindene, vinylnorbornene, alkyl substituents of tetrahydroindene and vinylnorbornene, methyltetrahydroindene, isopropenyl norbornene, 2,2-methylvinylnorbornene, 3-methyl-2-vinylnorbornene, 2-propenylnorbornene and mixtures thereof.

5. A hot melt composition according to claim 1, wherein said at least one unsaturated monomer (component C) is selected from the group consisting of unsaturated carboxylic acids, esters of unsaturated carboxylic acids, unsaturated dicarboxylic acids, anhydrides and diesters of the unsaturated dicarboxylic acids, unsaturated alcohols, lower carboxylic acid esters of unsaturated alcohols, unsaturated aldehydes, unsaturated nitriles, and unsaturated ethers.

6. A hot melt composition according to claim 1, wherein said at least one unsaturated monomer (component C) is selected from the group consisting of acrylic acid, methacrylic acid; methyl esters, ethyl esters, butyl esters, $\beta$-hydroxyethyl esters of acrylic acid and methacrylic acid; maleic acid and itaconic acid, anhydrides and diesters of the unsaturated dicarboxylic acids; allyl alcohol; vinyl acetate, vinyl propionate, allyl acetate, allyl propyonate; acrolein, methacrolein; acrylonitrile, methacrylonitrile; and unsaturated allyl glycidyl ether.

7. A hot melt composition according to claim 1, wherein said ethylene copolymer is a copolymer of 95 to 75 mol% of ethylene with 5 to 25 mol% of polar vinyl compound selected from the group consisting of vinyl acetate, an acrylic ester and a methacrylic ester.

8. A hot melt composition according to claim 1, wherein said waxes are selected from the group consisting of paraffin wax, microcrystalline wax, natural wax derived from animals and vegetables, polyethylene wax and polypropylene wax.

9. A hot melt composition according to claim 1, wherein 4 to 300 parts by weight of said hydrogenated resin (II) are mixed with 100 parts by weight of said one or more compound selected from the group consisting of ethylene copolymers, polyester resins and waxes.

10. A hot melt composition according to claim 1, further comprising 0 to 5 parts by weight of a filler, 0 to 5 parts by weight of an antioxidant, 0 to 20 parts by weight of a plasticizer and 0 to 10 parts by weight of a pigment.

* * * * *